US010909636B1

(12) United States Patent
Neveu et al.

(10) Patent No.: US 10,909,636 B1
(45) Date of Patent: *Feb. 2, 2021

(54) SYSTEM, METHOD AND NON-TRANSITORY COMPUTER READABLE MEDIUM FOR PARSING RECEIPT INFORMATION

(71) Applicant: Certify, Inc., Portland, ME (US)

(72) Inventors: Alan Neveu, Wilmington, NC (US); Robert Neveu, Brunswick, ME (US)

(73) Assignee: Certify, Inc., Portland, ME (US)

( * ) Notice: Subject to any disclaimer, the term of this patent is extended or adjusted under 35 U.S.C. 154(b) by 105 days.

This patent is subject to a terminal disclaimer.

(21) Appl. No.: 15/987,710

(22) Filed: May 23, 2018

Related U.S. Application Data

(63) Continuation of application No. 14/493,159, filed on Sep. 22, 2014, now Pat. No. 10,210,579.

(51) Int. Cl.
*G06F 1/00* (2006.01)
*G06Q 40/00* (2012.01)
*G06Q 10/10* (2012.01)

(52) U.S. Cl.
CPC ......... *G06Q 40/12* (2013.12); *G06Q 10/1093* (2013.01)

(58) Field of Classification Search
None
See application file for complete search history.

(56) References Cited

U.S. PATENT DOCUMENTS

| 7,419,094 | B2 | 9/2008 | Grear et al. |
| 7,552,190 | B1 | 6/2009 | Freishtat et al. |
| 7,647,257 | B2 | 1/2010 | Allen et al. |
| 7,792,709 | B1 | 9/2010 | Trandal et al. |
| 9,922,375 | B1* | 3/2018 | Neveu ..................... G06Q 40/12 |
| 10,210,579 | B1* | 2/2019 | Neveu ................ G06Q 10/1093 |
| 10,417,488 | B2* | 9/2019 | Penn ................... G06K 9/00442 |
| 2003/0120526 | A1 | 6/2003 | Altman et al. |

(Continued)

OTHER PUBLICATIONS www.certify.com website: ReceiptParse description from web archives dated Sep. 28, 2013 (https://web.archive.org/web/20130728073915/http://www.certify.com/ReceiptParseAutoFill.aspx).

(Continued)

*Primary Examiner* — Thomas L Mansfield
(74) *Attorney, Agent, or Firm* — Wolf, Greenfield & Sacks, P.C.

(57) ABSTRACT

Systems and methods for parsing receipt information are provided. A system includes a receipt parsing component executable by at least one processor. The receipt parsing component is configured to access a plurality of regular expressions associated with a plurality of vendor elements; identify a string of characters in received text that matches a character pattern specified by at least one regular expression of the plurality of regular expressions, wherein the at least one regular expression includes metacharacters; capture a value of a vendor element from the received text, wherein the value of the vendor element comprises the string of characters that match the character pattern; access reference data specifying additional elements associated with the value of the vendor element and information to identify values of the additional elements; and capture the values of the additional elements in the text based on the reference data.

20 Claims, 10 Drawing Sheets

(56) References Cited

U.S. PATENT DOCUMENTS

| | | | |
|---|---|---|---|
| 2004/0083134 A1* | 4/2004 | Spero | G06Q 20/20 705/16 |
| 2004/0167808 A1 | 8/2004 | Fredericks et al. | |
| 2005/0015316 A1 | 1/2005 | Salluzzo | |
| 2005/0197825 A1 | 9/2005 | Hagerman et al. | |
| 2005/0205660 A1 | 9/2005 | Munte | |
| 2006/0136585 A1 | 6/2006 | Mayfield et al. | |
| 2006/0206506 A1 | 9/2006 | Fitzpatrick | |
| 2007/0055597 A1 | 3/2007 | Patel et al. | |
| 2007/0192222 A1 | 8/2007 | Mika et al. | |
| 2007/0198450 A1 | 8/2007 | Khalsa | |
| 2007/0219879 A1 | 9/2007 | Furlong et al. | |
| 2008/0008303 A1 | 1/2008 | Maes | |
| 2008/0228600 A1 | 9/2008 | Treyz et al. | |
| 2008/0243564 A1 | 10/2008 | Busch et al. | |
| 2008/0313063 A1 | 12/2008 | Testa et al. | |
| 2009/0119574 A1 | 5/2009 | Gitlin et al. | |
| 2009/0150265 A1 | 6/2009 | Keld | |
| 2009/0291665 A1 | 11/2009 | Gaskarth et al. | |
| 2010/0017316 A1 | 1/2010 | Joseph et al. | |
| 2010/0061633 A1* | 3/2010 | Ma | G06K 9/38 382/176 |
| 2010/0094732 A1 | 4/2010 | Smith | |
| 2010/0145810 A1 | 6/2010 | Pourfallah et al. | |
| 2010/0306080 A1* | 12/2010 | Trandal | G06Q 10/10 705/26.8 |
| 2011/0218893 A1 | 9/2011 | Keld | |
| 2011/0295750 A1 | 12/2011 | Rammal | |
| 2012/0317003 A1 | 12/2012 | McGrane | |
| 2012/0323747 A1 | 12/2012 | Kantikovit et al. | |
| 2013/0129218 A1* | 5/2013 | Barrett | G06Q 20/401 382/182 |
| 2013/0179208 A1 | 7/2013 | Chung et al. | |
| 2013/0226318 A1 | 8/2013 | Procyk et al. | |
| 2014/0012722 A1 | 1/2014 | Keld | |
| 2014/0282016 A1 | 9/2014 | Hosier, Jr. | |
| 2015/0055481 A1 | 2/2015 | Guo et al. | |
| 2015/0120388 A1 | 4/2015 | Tan et al. | |
| 2015/0302531 A1 | 10/2015 | Thier et al. | |
| 2015/0347987 A1* | 12/2015 | Ali | G06Q 10/1097 705/7.21 |
| 2017/0243253 A1* | 8/2017 | DeBacco | G06Q 30/0268 |

OTHER PUBLICATIONS www.certify.com website: ReportExecutive description from web archives dated Oct. 23, 2013 (https://web.archive.org/web/20140327091856/http://www.certify.comCertifyReportExectuive.aspx).

www.certify.com website: ReportParse description from web archives dated Sep. 20, 2012 (https://web.archive.org/web/20120920075648/http://www.certify.com/).

U.S. Appl. No. 16/234,171, filed Dec. 27, 2018, Neveu et al.

\* cited by examiner

AMANO

Standard Parking
1 International Parkway
Portland, Maine 04102
(207) 772-7028

Full Statement

P/S #09      A Payment No. 00000135
T/O #22             Tick No. 037164
Entry Time  10/08/2010 (Wed) 4:49
Exit Time   10/08/2010 (Wed) 17:18
Parking Time            12:29
Parking Fee    Rate C    $12.00

Account #          ***********1023
Slip #                     79320
Authority #              286105
Credit Card Amount       $12.00
*********************************
T o t a l
P a i d             $ 1 2 . 0 0

FIG. 8

Company-wide Schedule

Coordinate expense report Build Day Certify users based on the following schedule:

○ Allow all users to choose their own schedule
○ Monthly on day [  ] of month
○ Monthly, [  ] days before end of month
○ Monthly, on the [First ▾] [Sunday ▾] of the month
○ Twice-monthly on days [  ] and [  ] of the month
○ Twice-monthly, day [  ] of month and [  ] days before end of month
◉ Weekly, on every [Wednesday ▾]

FIG. 9

Automatic Expense Report Settings

When building expense reports, adjust the date range to [ 3 ] days before Build Day (recommended = 3) >>

FIG. 10

Schedule Exceptions by Rule

Allow users in the following roles to choose their own schedule or disable ReportExecutive™ for their account:

☐ Accountants
☐ Executives
☐ Managers
☐ Employees

FIG. 11

Notifications and Reminders

Send the following e-mail notifications and reminders to users:

☐ First e-mail to users requesting them to add receipts to their Certify Wallet, sent [2] days before Build Day
Custom text to add to e-mail:

> Hey you guys, this is pre-build day notification number 1. You have two days to get your receipts into your Certify Wallet.

☑ Second e-mail to users requesting them to add receipts to their Certify Wallet, sent [1] days before Build Day
Custom text to add to e-mail:

> You have one day to get your receipts into your Certify Wallet, so hurry up and do that today!

☑ Build expense reports automatically and send e-mail to users on Build Day.
Custom text to add to e-mail:

> Hey gang, your automatic expense report should be ready for you to review and submit, so go for it.

☐ First e-mail to users reminding them to submit their expense reports for approval, sent [1] days after Build Day
☐ Add Approver to CC line
Custom text to add to e-mail:

> Now, I know you are busy and all, but you really need to review and submit that expense report.

☑ Second e-mail to users reminding them to submit their expense reports for approval, sent [2] days after Build Day
☐ Add Approver to CC line
Custom text to add to e-mail:

> Okay punk, this is your last warning! Get into Certify and review and submit your expense report, it is waiting for you!

FIG. 12

SYSTEM, METHOD AND NON-TRANSITORY COMPUTER READABLE MEDIUM FOR PARSING RECEIPT INFORMATION

RELATED APPLICATIONS

This Application is a Continuation of U.S. application Ser. No. 14/493,159, entitled "AUTOMATED EXPENSE REPORT SYSTEMS AND METHODS", filed on Sep. 22, 2014, which is incorporated herein by reference in its entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

Technical Field

The technical field of this disclosure relates generally to systems that track business expenses and, more specifically, to automated expense report systems.

Discussion

Tracking and reporting business expenses is an onerous and labor intensive process. Business people who travel or otherwise incur business expenses with regularity must complete a variety of tasks on a repeated basis to account properly for these expenses. Some of the tasks required to account properly for business expenses include organizing documentary proof of the expenses (e.g., receipts), recording facts that are descriptive of the expenses and the situation under which they were incurred, authoring expense reports including lists of expense and including the supporting materials described above, and submitting the expense reports for processing and eventual payment.

Conventional business expense tracking and reporting systems have automated some activities associated with tracking and reporting business expenses. However, many technical issues associated with business expense tracking and reporting remain unresolved. For example, although some conventional expense reporting systems attempt to use optical character recognition (OCR) technology to extract information from receipt images, such attempts have met with limited success, due to in large part to the extreme variance in receipt formatting styles. Also, because much of the information needed to account properly for business expenses comes from disparate sources, conventional expense reporting systems often lack much of the information needed to generate accurate and comprehensive business expense reports. These unresolved issues further affect conventional systems ability to enforce of a routine and predictable expense reporting process.

SUMMARY

Various aspects provide facilities to reliably generate expense reports according to a regular schedule. According to some aspects, these expense reports include data drawn automatically from a variety of data sources, thus decreasing the amount of data entry required by users. These data sources may include external systems that provide data in sundry formats, including graphical formats that are further processed, according to some aspects, to automatically and reliably isolate and identify values of receipt elements that conventional technology cannot.

More specifically, some embodiments manifest an appreciation that OCR technology is difficult to apply to receipts because receipts have irregular formatting and fonts and suffer from poor quality printing materials (e.g., low quality ink and paper). These problems are further exacerbated by the high significance of small details (e.g., decimal versus comma, slash versus the number one, etc.) within receipts.

According to one aspect, a computer system is provided. The computer system includes a memory, at least one processor in data communication with the memory, and a merging component executable by the at least one processor. The merging component is configured to identify a first element of a plurality of elements of expense report information, each element of the plurality of elements having a weight, the first element being descriptive of a first characteristic of a transaction; identify a second element of the plurality of elements of expense report information, the second element being descriptive of the first characteristic of the transaction; and generate a set of expense report information including an element of the plurality of elements of expense report information having a weight larger than weights of other elements of the plurality of elements of expense report information.

According to one embodiment, the first element is received from a first data source and the second element is received from a second data source and the merging component is further configured to assign a first weight to the first element based on a type of the first element and the first data source and assign a second weight to the second element based on a type of the second element and the second data source, wherein the merging component is configured to generate the set of expense report information at least in part by comparing the first weight to the second weight. In another embodiment, the computer system further comprises a financial institution interface component configured to receive transaction information descriptive of the transaction and a receipt entry user interface component configured to receive receipt information descriptive of the transaction, wherein the first data source is the financial institution interface component and the second data source is the receipt entry user interface component. In another embodiment, the computer system further comprises a partner interface component configured to receive partner information descriptive of the transaction, wherein the merging component is configured to generate the set of expense report information at least in part by generating an element of the set of expense report information from the partner information.

In another embodiment, the transaction information includes a third element descriptive of a second characteristic of the transaction, the receipt information includes a fourth element descriptive of a third characteristic of the transaction, and the partner information includes a fifth element descriptive of a fourth characteristic of the transaction, and the merging component is configured to generate the set of expense report information at least in part by generating elements of the set of expense report information from the third, fourth, and fifth elements. In another embodiment, the computer system further comprises an expense report entry user interface component configured to receive expense report information descriptive of the transaction, wherein the merging component is configured to generate the set of expense report information at least in part by generating an element of the set of expense report information from the expense report information. In another embodiment, the computer system further comprises a receipt parsing component configured to generate parsed receipt information descriptive of the transaction, wherein the merging component is configured to generate the set of expense report information at least in part by generating an element of the set of expense report information from the parsed receipt information.

According to another aspect, a method for automatically merging expense report information using a computer system is provided. The method includes acts of identifying, by the computer system, a first element of a plurality of elements of expense report information, each element of the plurality of elements having a weight, the first element being descriptive of a first characteristic of a transaction; identifying a second element of the plurality of elements of expense report information, the second element being descriptive of the first characteristic of the transaction; and generating a set of expense report information including an element of the plurality of elements of expense report information having a weight larger than weights of other elements of the plurality of elements of expense report information.

According to one embodiment, the method further includes acts of receiving the first element from a first data source; receiving the second element from a second data source; assigning a first weight to the first element based on a type of the first element and the first data source; and assigning a second weight to the second element based on a type of the second element and the second data source, wherein generating the set of expense report information includes comparing the first weight to the second weight. In another embodiment, the act of receiving the first element includes an act of receiving the first element via a financial institution interface component configured to receive transaction information descriptive of the transaction and receiving the second element includes receiving the second element via a receipt entry user interface component configured to receive receipt information descriptive of the transaction. In another embodiment, the method further includes an act of receiving partner information descriptive of the transaction via a partner interface component, wherein generating the set of expense report information includes generating an element of the set of expense report information from the partner information. In another embodiment, the transaction information includes a third element descriptive of a second characteristic of the transaction, the receipt information includes a fourth element descriptive of a third characteristic of the transaction, and the partner information includes a fifth element descriptive of a fourth characteristic of the transaction, and the act of generating the set of expense report information includes an act of generating elements of the set of expense report information from the third, fourth, and fifth elements.

In another embodiment, the method further comprises receiving expense report information descriptive of the transaction via an expense report entry user interface component, wherein generating the set of expense report information includes generating an element of the set of expense report information from the expense report information. In another embodiment, the method further comprises generating parsed receipt information descriptive of the transaction using a receipt parsing component, wherein generating the set of expense report information includes generating an element of the set of expense report information from the receipt information.

According to another aspect, a non-transitory computer readable medium is provided. The medium stores sequences of computer executable instructions to implement a method for automatically merging expense report information. The sequences of instructions include instructions to identify a first element of a plurality of elements of expense report information, each element of the plurality of elements having a weight, the first element being descriptive of a first characteristic of a transaction; identify a second element of the plurality of elements of expense report information, the second element being descriptive of the first characteristic of the transaction; and generate a set of expense report information including an element of the plurality of elements of expense report information having a weight larger than weights of other elements of the plurality of elements of expense report information.

According to one embodiment, the sequences of instructions further include instructions to receive the first element from a first data source; receive the second element from a second data source; assign a first weight to the first element based on a type of the first element and the first data source; and assign a second weight to the second element based on a type of the second element and the second data source and wherein the instructions to generate the set of expense report information include instructions to compare the first weight to the second weight. In another embodiment, the instructions to receive the first element include instructions to receive the first element via a financial institution interface component configured to receive transaction information descriptive of the transaction and the instructions to receive the second element include instructions to receive the second element via a receipt entry user interface component configured to receive receipt information descriptive of the transaction. In another embodiment, the sequences of instructions further include instructions to receive partner information descriptive of the transaction via a partner interface component and wherein the instructions to generate the set of expense report information include instructions to generate an element of the set of expense report information from the partner information. In another embodiment, the transaction information includes a third element descriptive of a second characteristic of the transaction, the receipt information includes a fourth element descriptive of a third characteristic of the transaction, and the partner information includes a fifth element descriptive of a fourth characteristic of the transaction, and the instructions to generate the set of expense report information include instructions to generate elements of the set of expense report information from the third, fourth, and fifth elements. In another embodiment, the sequences of instructions further include instructions to receive expense report information descriptive of the transaction via an expense report entry user interface component and wherein the instructions to generate the set of expense report information include instructions to generate an element of the set of expense report information from the expense report information.

According to another aspect, a computer system is provided. The computer system includes a memory; at least one processor in data communication with the memory; an optical character recognition (OCR) component executable by the at least one processor; and a receipt parsing component executable by the at least processor. The receipt parsing component is configured to receive an image of a receipt; request execution of the OCR component to convert the image to text; identify a value of a vendor element in the text; identify values of additional elements in the text based on the value of the vendor element; and store the vendor elements and the additional elements in a data store.

According to one embodiment, the receipt parsing component is configured to identify the value of the vendor element at least in part by searching the text for at least one regular expression. In another embodiment, the at least one regular expression includes metacharacters. In another embodiment, the receipt parsing component is configured to identify the values of the additional elements by identifying the additional elements as being associated with the value of the vendor element, searching the text for regular expressions associated with the additional elements, and locating the values using receipt format information associated with the additional elements that specifies locations for the values relative to the regular expressions. In another embodiment, the receipt parsing component is further configured to identify a category for a transaction described by the receipt. In another embodiment, the receipt parsing component is configured to identify the category using at least one of the value of the vendor element and the values of the additional elements. In another embodiment, the receipt parsing component is configured to receive the image from an external system.

According to another aspect, a method of parsing receipt information using a computer system is provided. The method includes acts of receiving, by the computer system, an image of a receipt; requesting execution of an optical character recognition (OCR) component to convert the image to text; identifying a value of a vendor element in the text; identifying values of additional elements in the text based on the value of the vendor element; and storing the vendor elements and the additional elements in a data store.

According to another embodiment, the act of identifying the value of the vendor element includes an act of searching the text for at least one regular expression. In another embodiment, the act of searching the text includes an act of searching for metacharacters. In another embodiment, the act of identifying the values of the additional elements includes acts of identifying the additional elements as being associated with the value of the vendor element, searching the text for regular expressions associated with the additional elements, and locating the values using receipt format information associated with the additional elements that specifies locations for the values relative to the regular expressions. In another embodiment, the method further includes an act of identifying a category for a transaction described by the receipt. In another embodiment, the act of identifying the category includes an act of identifying the category using at least one of the value of the vendor element and the values of the additional elements. In another embodiment, the act of receiving the image includes an act of receiving an image from an external system.

According to another aspect, a non-transitory computer readable medium is provided. The medium stores sequences of computer executable instructions to implement a method for parsing receipt information. The sequences of instructions include instructions to receive an image of a receipt; request execution of an optical character recognition (OCR) component to convert the image to text; identify a value of a vendor element in the text; identify values of additional elements in the text based on the value of the vendor element; and store the vendor elements and the additional elements in a data store.

According to one embodiment, the instructions to identify the value of the vendor element include instructions to search the text for at least one regular expression. In another embodiment, the instructions to search the text include instructions to search for metacharacters. In another embodiment, the instructions to identify the values of the additional elements include instructions to identify the additional elements as being associated with the value of the vendor element, search the text for regular expressions associated with the additional elements and to locate the values using receipt format information associated with the additional elements that specifies locations for the values relative to the regular expressions. In another embodiment, the sequences of instructions further include instructions to identify a category for a transaction described by the receipt. In another embodiment, the instructions to identify the category include instructions to indentify the category using at least one of the value of the vendor element and the values of the additional elements.

According to another aspect, a computer system is provided. The computer system includes a memory; at least one processor in data communication with the memory; and a reporting component executable by the at least processor and configured to execute a user interface component configured to receive schedule information, the schedule information including a company-wide schedule specifying an expense report generation date and at least one reminder; store the schedule information in a data store; send the at least one reminder to a plurality of users prior to the expense report generation date; and generate, on the expense report generation date, a plurality of expense reports respectively corresponding to the plurality of users.

According to one embodiment, the at least one reminder includes customized text. In another embodiment, the schedule information includes schedule information specifying a date relative to the expense report generation date and the reporting component is configured to send the at least one reminder on the date relative to the expense report generation date. In another embodiment, the at least on reminder includes a plurality of reminders and the reporting component is configured to send the at least one reminder at least in part by sending one or more reminders of the plurality of reminders after the expense report generation date. In another embodiment, the schedule information includes schedule information specifying a date relative to the expense report generation date and the reporting component is configured to send the one or more reminders on the date relative to the expense report generation date. In another embodiment, the schedule information includes at least one employee-specific schedule specifying an employee-specific expense report generation date for at least one employee user and the reporting component is further configured to generate, on the employee-specific expense report generation date, at least one expense report corresponding to the at least one employee user. In another embodiment, the schedule information includes date adjustment information specifying an adjustment date relative to the expense report generation date and the reporting component is configured to generate each expense report of the plurality of expense reports to include transactions dated prior to or on the adjustment date and no transactions dated after the adjustment date.

According to another aspect, a method for managing automatic generation of expense reports using a computer system is provided. The method includes acts of executing, by the computer system, a user interface component configured to receive schedule information, the schedule information including a company-wide schedule specifying an expense report generation date and at least one reminder; storing the schedule information in a data store; sending the at least one reminder to a plurality of users prior to the expense report generation date; and generating, on the expense report generation date, a plurality of expense reports respectively corresponding to the plurality of users.

According to another embodiment, the act of sending the at least one reminder includes an act of sending customized text. In another embodiment, the act of storing the schedule information includes an act of storing schedule information specifying a date relative to the expense report generation date and sending the at least one reminder includes sending the at least one reminder on the date relative to the expense report generation date. In another embodiment, the act of sending the at least one reminder includes an act of sending one or more reminders after the expense report generation date. In another embodiment, the act of storing the schedule information includes an act of storing schedule information specifying a date relative to the expense report generation date and sending the one or more reminders includes sending the one or more reminders on the date relative to the expense report generation date. In another embodiment, the act of storing the schedule information includes an act of storing schedule information including at least one employee-specific schedule specifying an employee-specific expense report generation date for at least one employee user and the method further comprises generating, on the employee-specific expense report generation date, at least one expense report corresponding to the at least one employee user. In another embodiment, the act of storing the schedule information includes storing schedule information including date adjustment information specifying an adjustment date relative to the expense report generation date and generating each expense report includes generating each expense report to include transactions dated prior to or on the adjustment date and no transactions dated after the adjustment date.

According to another aspect, a non-transitory computer readable medium is provided. The medium stores sequences of computer executable instructions to implement a method for managing automatic generation of expense reports. The sequences of instructions include instructions to execute a user interface component configured to receive schedule information, the schedule information including a company-wide schedule specifying an expense report generation date and at least one reminder; store the schedule information in a data store; send the at least one reminder to a plurality of users prior to the expense report generation date; and generate, on the expense report generation date, a plurality of expense reports respectively corresponding to the plurality of users.

According to another embodiment, the instructions to send the at least one reminder include instructions to send customized text. In another embodiment, the instructions to store the schedule information include instructions to store schedule information specifying a date relative to the expense report generation date and the instructions to send the at least one reminder include instructions to send the at least one reminder on the date relative to the expense report generation date. In another embodiment, the instructions to send the at least one reminder include instructions to send one or more reminders after the expense report generation date. In another embodiment, the instructions to store the schedule information include instructions to store schedule information including at least one employee-specific schedule specifying an employee-specific expense report generation date for at least one employee user and the sequences of instructions further include instructions to generate, on the employee-specific expense report generation date, at least one expense report corresponding to the at least one employee user. In another embodiment, the instructions to store the schedule information include instructions to store schedule information including date adjustment information specifying an adjustment date relative to the expense report generation date and the instructions to generate each expense report include instructions to generate each expense report to include transactions dated prior to or on the adjustment date and no transactions dated after the adjustment date.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 2 is an illustration of a user interface configured to communicate receipt information;

FIG. 3 is an illustration of a user interface configured to communicate expense report information;

FIG. 8 is a receipt image;

FIG. 9 is an illustration of a user interface configured to communicate company-wide schedule information;

FIG. 10 is an illustration of a user interface configured to communicate date adjustment information;

FIG. 11 is an illustration of a user interface configured to communicate exceptions to a company-wide schedule; and FIG. 12 is an illustration of a user interface configured to communicate notification and reminder information.

DETAILED DESCRIPTION

Figure 1:
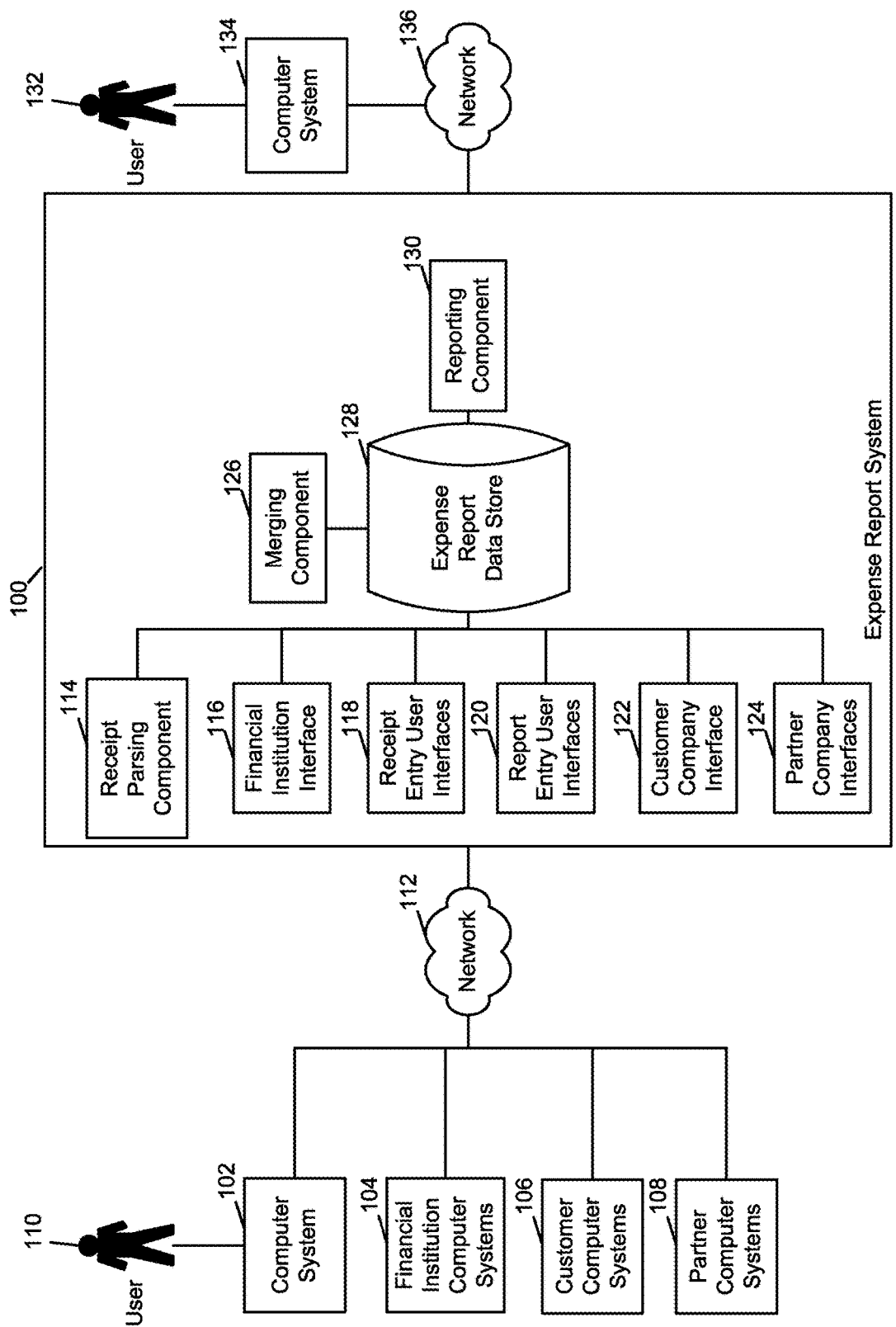
FIG. 1 is a block diagram of an expense report system within the context of several external entities with which the expense report system interoperates.

Some embodiments disclosed herein include apparatus and processes that implement a system configured to reliably parse receipt element values from images of physical documents (e.g., receipts). For example, according to some embodiments, a specially configured computer system (i.e., an expense report system) is configured to receive receipt information in the form of an image file (e.g., a.tiff, .png, .bmp, .jpeg, .pdf, .html, .txt or other type of image file). The image file may depict alphanumeric text, logos, drawings, pictures, or other visual objects. In these embodiments, the expense report system is configured to process the image file using optical character recognition (OCR) technology to generate receipt information in the form of textual information (e.g. a file including Unicode characters). In some embodiments, the receipt information may include, in addition to the textual information, supplemental information descriptive of visual objects not recognized by conventional OCR processing (e.g., a .tiff version of a logo on a receipt). Additionally, in these embodiments, the expense report system is configured to filter this receipt information to identify one or more regularized expressions that indicate receipt elements that are important to successfully parsing the receipt information. In at least one embodiment, the expense report system is configured to adapt subsequent parsing of the receipt information based on the presence of one or more regularized expressions within the receipt information. In this embodiment, the subsequent parsing reliably identifies receipt element values within the receipt information. These receipt element values are subsequently used to automatically generate expense reports.

In some embodiments, the expense report system is further configured to receive and merge values of receipt and expense elements of expense reports from multiple data sources so that the most comprehensive and accurate set of receipt and expense element values available is used for subsequent expense report generation processes. In these embodiments, the expense report system is configured to receive expense report information from external systems such as financial institution systems, data entry systems, customer systems, and partner systems. Additionally, in these embodiments, the expense report system is configured to parse the expense report information received from the external systems into receipt and expense element values. In at least one embodiment, the expense report system is configured to assign a weight to each receipt and expense element based on the receipt or expense element type and the data source of the receipt or expense element value. In this embodiment, the expense report system is configured to store the receipt and expense elements, their values, and their assigned weights for subsequent expense report generation processes. In some embodiments, the expense report system is configured to settle conflicts between multiple receipt and expense element for a transaction by assigning the receipt or expense element having the greatest weight to the transaction.

In some embodiments, the expense report system is configured to provide an interface through which the expense report system communicates schedule information. This schedule information specifies times at which the expense report system is to execute expense report generation processes using previously processed and stored expense report information. This schedule information may also specify groups or individuals who are required (or not required) to review generated expense reports according to target time frames. The schedule information may further specify messages to be sent to the groups or individuals who comply (or do not comply) with the target time frames. In these embodiments, the expense report system is configured to store any schedule information received via the interface and to execute expense report generation and communication processes in accord with the stored schedule information.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Expense Report System

Some embodiments disclosed herein implement an expense report system using one or more computer systems, such as the computer systems described below with reference to FIG. 4. According to these embodiments, the expense report system extracts receipt element values from receipt information, merges expense report information received from a variety of data sources into a central data store, and generates expense reports using the expense report information stored in the central data store. FIG. 1 illustrates an example expense report system 100 within the context of several external entities that interoperate with the expense report system 100. As shown, FIG. 1 includes the expense report system 100, users 110 and 132, computer systems 102, 104, 106, 108, and 134, and communications networks 112 and 136. The expense report system 100 includes a receipt parsing component 114; additional interface components 116, 118, 120, 122, and 124; a merging component 126; a reporting component 130; and an expense report data store 128. In at least one embodiment, the receipt parsing component 114 implements a ReceiptParse® process, which is commercially available from Certify, Inc. of Portland, Me. In another embodiment, the merging component 126 implements an AutoMerge™ process, which is commercially available from Certify, Inc. In another embodiment, the reporting component 130 implements a ReportExecutive™ process, which is commercially available from Certify, Inc.

As illustrated in FIG. 1, the expense report system 100 and the computer systems 102, 104, 106, and 108 communicate (i.e. transmit or receive) information via the network 112. Similarly, the expense report system 100 and the computer system 134 communicate via the network 136. The networks 112 and 136 may include any communication networks through which computer systems communicate information. For example, each of the networks 112 and 136 may be a public network, such as the Internet, and may include other public or private networks such as LANs, WANs, extranets, intranets, and cloud computing systems. Each of the networks 112 and 136 may also include cellular networks such as LTE, 4G, HSDPA/HSUPA, TD-SCDMA, W-CDMA, CMDA, WiFi, Bluetooth, EvDO, GSM, and iDEN networks. Although shown as two networks in FIG. 1, in some embodiments, the networks 112 and 136 may be combined include a single network or may include three or more networks.

Figure 2:
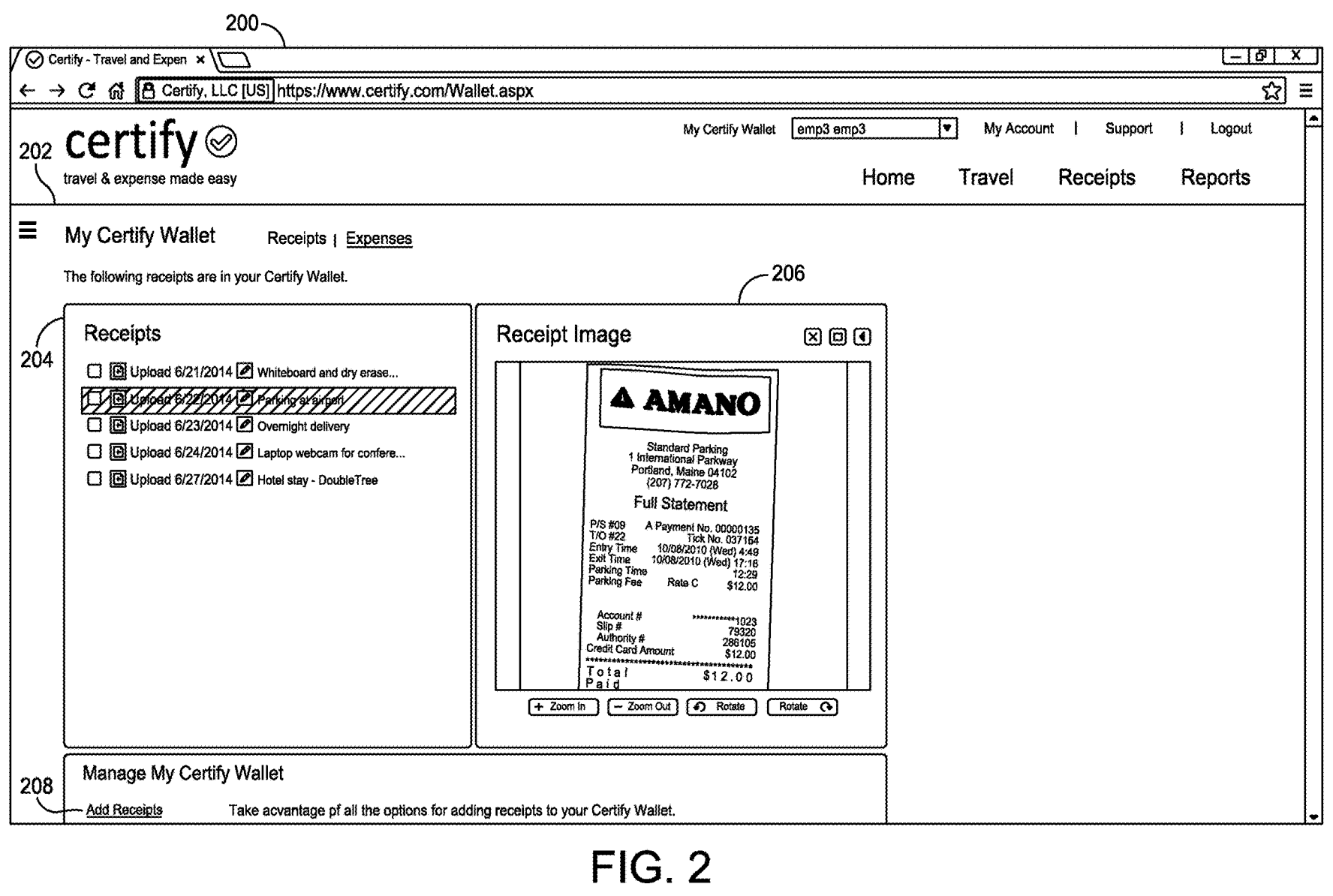

According to some embodiments illustrated by FIG. 1, each of the computer systems 102, 104, 106, and 108 is configured to communicate expense report information with the expense report system 100 via the network 112. For example, when executing according to this configuration, the computer system 102 transmits one or more images of receipts to the expense report system 100 via the network 112. In this embodiment, a user interface is provided by the computer system 102, and the user 110 interacts (e.g., provides input or receives output) with the user interface to identify the receipt information for transmission to the expense report system 100. In some examples, this user interface is a browser-based user interface served by the expense report system 100 to the computer system 102 via the network 112. In other examples, the user interface includes specialized client programs that execute outside of a browser environment, such as an application program executing on a mobile computing device. The user interface may be implemented using a variety of technologies and may include sundry elements (e.g., screens, windows, buttons, boxes, etc) arranged according to various user interface metaphors. FIG. 2 illustrates elements provided by one example of the user interface.

More specifically, FIG. 2 shows a screen 200 that is configured to communicate receipt information according to one embodiment. The screen 200 includes a wallet area 202 that displays receipt information associated with a user. The wallet area 202 includes a receipts area 204, a receipt image area 206, and an add receipts link 208. The receipts area 204 displays a list of information descriptive of receipts previously entered into the expense report system 100. The receipt image area 206 displays an image of the receipt currently selected in the receipts area 204, if such an image is stored in the expense report system 100 (e.g., in the expense report data store 128). The add receipts link 208, when actuated by the user, provides additional screens configured to receive one or more identifiers of receipt information locally stored on the computer system 102. Responsive to receiving the one or more identifiers, the computer system 102 transmits the identified receipt information (e.g., an image of a receipt) to the expense report system 100 via the network 112.

In another embodiment, the financial institution computer systems 104 transmit transaction information descriptive of transactions (e.g., credit or debit card transactions) to the expense report system 100 on a periodic or on-demand basis. The transaction information included in these transmissions may describe transactions conducted by users of the expense report system 100. In one embodiment, the financial institution computer systems 104 receive configuration information that associates cards (e.g., credit or debit cards) with users of the expense report system 100. For example, this configuration information may specify identifiers of credit cards that belong to a corporate card program of a customer company. According to this embodiment, the financial institution computer systems 104 identify transactions conducted using the cards associated with the users prior to transmitting transaction information descriptive of the transactions as described above.

In another embodiment, the customer computer systems 106 transmit a variety of customer information to the expense report system 100 on a periodic or on-demand basis. This customer information may include configuration information descriptive of users of the expense report system, approval routing paths, project lists, and general ledger account codes.

In another embodiment, the partner computer systems 108 transmit partner information to the expense report system 100 on a periodic or on-demand basis. This partner information may include transaction information descriptive of transactions related to travel (e.g., airfare, rental car, and hotel transaction information). As described further below regarding the merging component 126, in some situations, the transaction information received from the financial institution computer systems 104 may be more authoritative than, and thus supersede, the information received from the partner computer systems 108.

Figure 3:
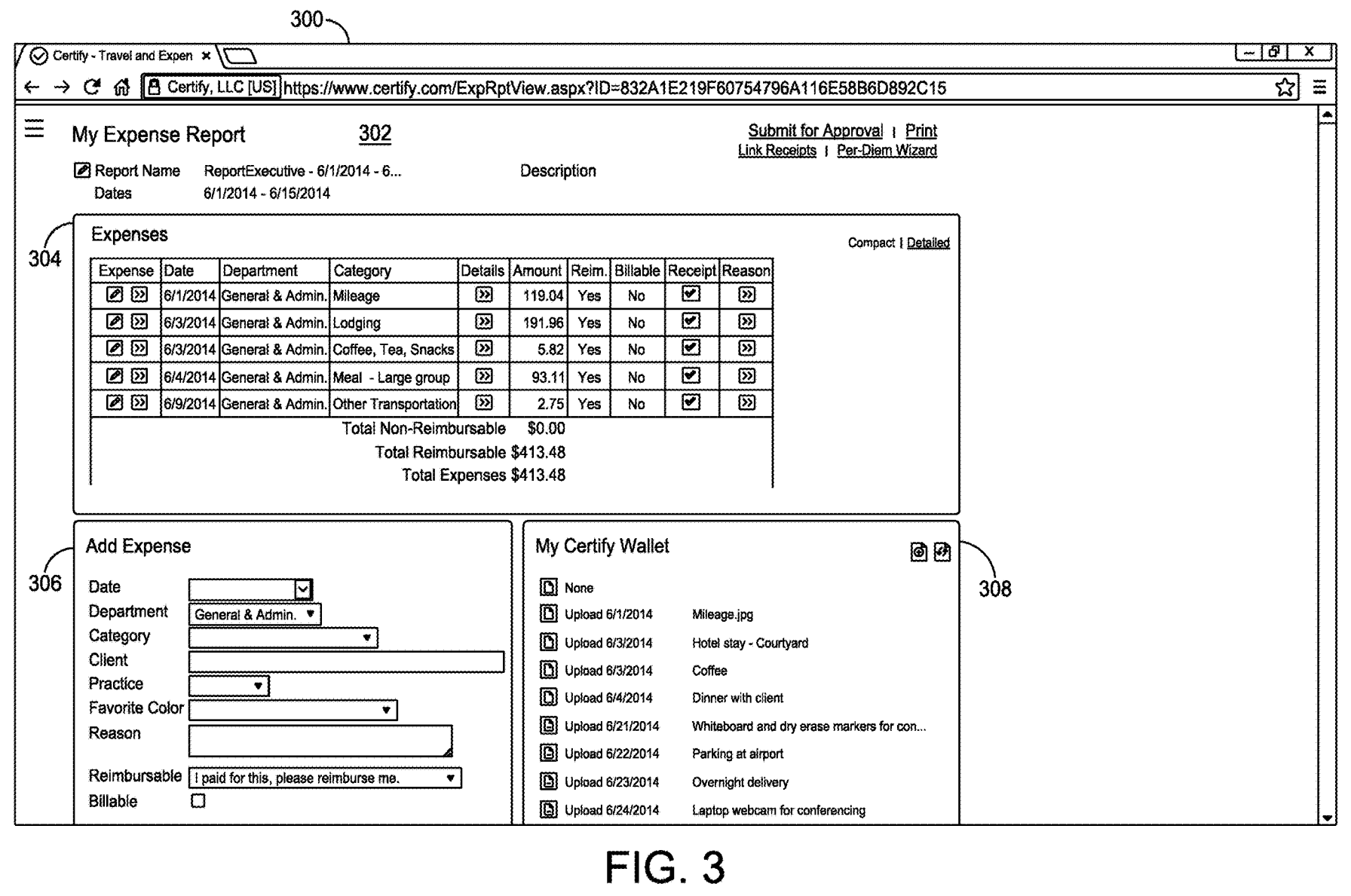

According to various embodiments illustrated by FIG. 1, the user 132 interacts with a user interface of the computer system 134 to review and submit expense reports. In some embodiments, this user interface is a browser-based user interface served by the expense report system 100 via the network 136. In other embodiments, the user interface includes specialized client programs that execute outside of a browser environment, such as an application program executing on a mobile device. The user interface may be implemented using a variety of technologies and may include sundry elements (e.g., screens, windows, buttons, boxes, etc) arranged according to various user interface metaphors. FIG. 3 illustrates elements provided by one example of this user interface.

More specifically, FIG. 3 shows a screen 300 that is configured to communicate expense report information according to one embodiment. When executing according to this configuration, the screen 300 includes an expense report area 302 that identifies and summaries the expense report being displayed. The expense report area 302 includes an expenses area 304, an add expense area 306, and a wallet area 308. The expenses area 304 displays expense report line items included within the expense report identified in the expense report area 302. The add expense area 306 provides a group of user interface elements configured to receive input from a user that specifies new expense report line items. The wallet area 308 displays receipt information available for inclusion with the expense report identified in the expense report area 302.

In some embodiments illustrated by FIG. 1, the expense report system 100 includes several interface components that are configured to communicate with the computer systems 102, 104, 106, 108, and 132. These interface components include the receipt parsing component 114, the financial institution interface component 116, the recipe entry user interface components 118, the report entry user interface components 120, the customer company interface component 122, and the partner company interface components 124. Each of these interface components is configured to receive expense report information and store the expense report information in the expense report data store 128. Additionally, each of these interface components may both restrict input to a predefined set of values and validate any information entered prior to using the information or providing the information to other components. Moreover, each of these interface components may validate the identity of an external entity prior to, or during, interaction with the external entity. These functions may prevent the introduction of erroneous data into the expense report system 100 or unauthorized access to the expense report system 100.

In one example, the receipt parsing component 114 is configured to receive images of receipts from external systems, parse receipt information from the received images, and store the parsed information in the expense report data store 128. Further, in some embodiments, the receipt parsing component is configured to categorize receipts based on historical information stored in the expense report data store 128. This historical information may be include expense report information (e.g., receipt information) that spans users, departments, and even customer companies, thus enabling the receipt parsing component to learn and categorize expense report information with a high degree of accuracy. Example processes executed by the receipt parsing component 114 are described further below with reference to FIG. 5.

In another example, the financial institution interface 116 receives transaction information from financial institutions via the financial institution computer systems 104 and the network 112. This transaction information may describe transactions to be expensed. Responsive to receipt of the transaction information, the financial institution interface 116 stores internal representations of the transaction information in the expense report data store 128.

In another example, the receipt entry user interfaces 118 receive receipt information from users via the computer system 102 and the network 112. This receipt information describes receipts of transactions that may be expensed. In this example, the user may interact with sundry types of user interfaces provided by the computer system 102 to input the receipt information. Examples of these user interfaces include text messaging applications, image capture applications, specialized client applications, browser based applications, and email applications. These types of user interfaces may provide receipt information as attachments to messages, uploaded data files, or as any other logical and physical grouping of data. In response to receipt of the receipt information, the receipt entry user interfaces 118 store internal representations of the receipt information in the expense report data store 128.

In another example, the report entry user interfaces 120 receive expense report information from users via the computer system 102 and the network 112. This expense report information describes expense reports of transactions that may be expensed. In this example, user may interact with sundry types user interfaces provided by the computer system 102 to input the expense report information. Examples of these user interfaces include text messaging applications, image capture applications, specialized client applications, browser based applications, and email applications. These types of user interfaces may provide expense report information as attachments to messages, uploaded data files, or as any other logical and physical groupings of data. Responsive to receipt of the expense report information, the report entry user interfaces 124 store internal representations of the expense report information in the expense report data store 128.

In another example, the customer company interface 122 receives customer information from customer companies via the customer computer systems 106 and the network 112. This customer information may include configuration information descriptive of users of the expense report system, approval routing paths, project lists, and general ledger account codes. Responsive to receipt of the customer information, the customer company interface 122 stores internal representations of the customer information in the expense report data store 128.

In another example, the partner company interfaces 124 receive partner information from partners via the partner computer systems 108 and the network 112. This partner information may include transaction information descriptive of transactions related to travel (e.g., airfare, rental car, and hotel transaction information). Responsive to receipt of the partner information, the partner company interfaces 124 store internal representations of the partner information in the expense report data store 128.

As described above, the expense report system 100 receives expense report information from a variety of data sources (e.g., the interface components 114, 116, 118, 120, 122, and 124 that receive various expense report information from a plurality of external systems). Two or more of these data sources may provide expense report information describing the same transaction. In some instances, this expense report information may describe different elements of the same transaction. In other instances, this expense report information may describe the same element of the same transaction (i.e., two or more data sources may provide "duplicate" expense report information). Duplicate expense report information may include values that agree (e.g., are equal) and values that conflict (e.g., are not equal).

In some embodiments illustrated by FIG. 1, the merging component 126 is configured to resolve conflicting values within duplicate expense report information and merge expense report information received from various data sources into a unified set of expense report information for each transaction to be included in an expense report. In these embodiments, each set of merged expense report information describes a transaction using the most comprehensive and trustworthy information available to the expense report system 100. In some embodiments, when executing according to this configuration, the merging component 126 merges expense report information by identifying elements of expense report information within the expense report data store 128 that have not been subject to previous auto merge processing, assigning weight values to these unmerged elements, and storing the merged elements and their assigned weights in the expense report data store 128. Example processes executed by the merging component 126 are described further below with reference to FIG. 6.

In another embodiment illustrated by FIG. 1, the reporting component 130 is configured to receive schedule information, store the schedule information in the expense report data store 128, and execute expense report generation processes according to the schedule information. Example processes executed by the reporting component 130 are described further below with reference to FIG. 7.

In another embodiment illustrated by FIG. 1, the expense report system 100 is configured to communicate payment instructions to the financial institution computer systems 102. When executing according to this configuration according to one embodiment, the financial institution interface 116 generates and transmits ACH payment instructions to the financial institution computer systems 104 to reimburse users for expenses they paid on behalf of their employer. These ACH payment instructions may transfer, for example, funds from an account of the employer to a checking or saving account of the user. In another embodiment, the financial institution interface 116 generates and transmits ACH payment instructions to the financial institution computer systems 104 to pay corporate credit card program balances. These ACH payment instructions may transfer, for example, funds from an account of the corporation to a payment account of the financial institution who issued the corporate credit cards.

In another embodiment illustrated by FIG. 1, the expense report data store 128 is configured to store expense report information. This expense report information may include receipt information (in the form of image information, textual information, supplemental information, or other forms of receipt information), partner information, customer information, configuration information, information that identifies and summaries individual expense reports, information descriptive of elements of expense reports (i.e., receipt elements and expense elements), schedule information, transaction information, cross-reference information, or any other information required by the expense report system 100 to perform the processes and functions disclosed herein. Additional expense report information stored within the expense report data store is described further below with reference to FIGS. 5-7.

Information may flow between the components illustrated in FIG. 1, or any of the elements, components and subsystems disclosed herein, using a variety of techniques. Such techniques include, for example, passing the information over a network using standard protocols, such as TCP/IP, HTTP, or HTTPS, passing the information between modules in memory and passing the information by writing to a file, database, data store, or some other nonvolatile data storage device, among others. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Within the expense report system 100, data may be stored in any logical construction capable of storing information on a computer readable medium including, among other structures, flat files, indexed files, search engine indexes, hierarchical databases, relational databases or object oriented databases. These data structures may be specifically configured to conserve storage space or increase data exchange performance. In addition, various examples organize the data into particularized and, in some cases, unique structures to perform the functions disclosed herein. In these examples, the data structures are sized and arranged to store values for particular types of data, such as integers, floating point numbers, character strings, arrays, linked lists, and the like.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices (e.g., smart phones, tablet computers, and personal digital assistants) and network equipment (e.g., load balancers, routers, and switches). Examples of particular models of mobile computing devices include iPhones, iPads, and iPod touches running iOS operating system available from Apple, Android devices like Samsung Galaxy Series, LG *Nexus*, and Motorola Droid X, Blackberry devices available from Blackberry Limited, and Windows Phone devices. Further, aspects may be located on a single computer system or may be distributed among a plurality of computer systems connected to one or more communications networks.

For example, various aspects, functions, and processes may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Figure 4:
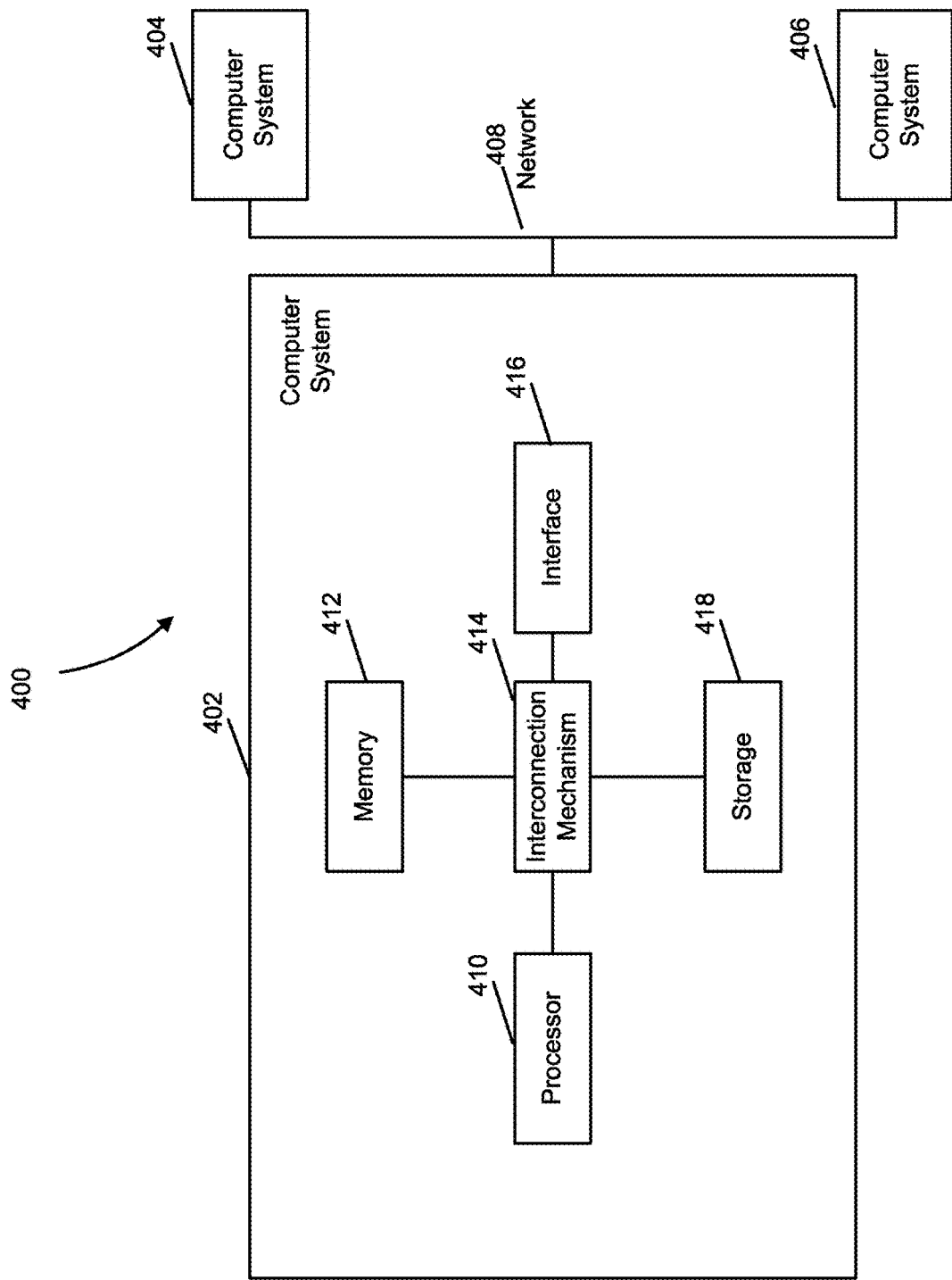
FIG. 4 is a schematic diagram of a distributed computer system.

Referring to FIG. 4, there is illustrated a block diagram of a distributed computer system 400, in which various aspects and functions are practiced. As shown, the distributed computer system 400 includes one or more computer systems that exchange information. As used herein, the terms "communicate" and "exchange" in the context of computer systems are interchangeable both refer to transmitting or receiving information. More specifically, the distributed computer system 400 includes computer systems 402, 404, and 406. As shown, the computer systems 402, 404, and 406 are interconnected by, and may exchange data through, a communication network 408. The network 408 may include any communication network through which computer systems may exchange data. To exchange data using the network 408, the computer systems 402, 404, and 406 and the network 408 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 402, 404, and 406 may transmit data via the network 408 using a variety of security measures including, for example, SSL or VPN technologies. While the distributed computer system 400 illustrates three networked computer systems, the distributed computer system 400 is not so limited and may include any number of computer systems and computing devices, networked using any medium and communication protocol.

As illustrated in FIG. 4, the computer system 402 includes a processor 410, a memory 412, an interconnection element 414, an interface 416 and data storage element 418. To implement at least some of the aspects, functions, and processes disclosed herein, the processor 410 performs a series of instructions that result in manipulated data. The processor 410 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 410 is connected to other system components, including one or more memory devices 412, by the interconnection element 414.

The memory 412 stores programs (e.g., sequences of instructions coded to be executable by the processor 410) and data during operation of the computer system 402. Thus, the memory 412 may be a relatively high performance, volatile, random access memory such as a dynamic random access memory ("DRAM") or static memory ("SRAM"). However, the memory 412 may include any device for storing data, such as a disk drive or other nonvolatile storage device. Various examples may organize the memory 412 into particularized and, in some cases, unique structures to perform the functions disclosed herein. These data structures may be sized and organized to store values for particular data and types of data.

Components of the computer system 402 are coupled by an interconnection element such as the interconnection element 414. The interconnection element 414 may include any communication coupling between system components such as one or more physical busses in conformance with specialized or standard computing bus technologies such as IDE, SCSI, PCI and InfiniBand. The interconnection element 414 enables communications, including instructions and data, to be exchanged between system components of the computer system 402.

The computer system 402 also includes one or more interface devices 416 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 402 to exchange information and to communicate with external entities, such as users and other systems.

The data storage element 418 includes a computer readable and writeable nonvolatile, or non-transitory, data storage medium in which instructions are stored that define a program or other object that is executed by the processor 410. The data storage element 418 also may include information that is recorded, on or in, the medium, and that is processed by the processor 410 during execution of the program. More specifically, the information may be stored in one or more data structures specifically configured to conserve storage space or increase data exchange performance. The instructions may be persistently stored as encoded signals, and the instructions may cause the processor 410 to perform any of the functions described herein. The medium may, for example, be optical disk, magnetic disk or flash memory, among others. In operation, the processor 410 or some other controller causes data to be read from the nonvolatile recording medium into another memory, such as the memory 412, that allows for faster access to the information by the processor 410 than does the storage medium included in the data storage element 418. The memory may be located in the data storage element 418 or in the memory 412, however, the processor 410 manipulates the data within the memory, and then copies the data to the storage medium associated with the data storage element 418 after processing is completed. A variety of components may manage data movement between the storage medium and other memory elements and examples are not limited to particular data management components. Further, examples are not limited to a particular memory system or data storage system.

Although the computer system 402 is shown by way of example as one type of computer system upon which various aspects and functions may be practiced, aspects and functions are not limited to being implemented on the computer system 402 as shown in FIG. 4. Various aspects and functions may be practiced on one or more computers having a different architectures or components than that shown in FIG. 4. For instance, the computer system 402 may include specially programmed, special-purpose hardware, such as an application-specific integrated circuit ("ASIC") tailored to perform a particular operation disclosed herein. While another example may perform the same operation using a grid of several general-purpose computing devices running MAC OS System X with Intel processors and several specialized computing devices running proprietary hardware and operating systems.

The computer system 402 may be a computer system including an operating system that manages at least a portion of the hardware elements included in the computer system 402. In some examples, a processor or controller, such as the processor 410, executes an operating system. Examples of a particular operating system that may be executed include a Windows-based operating system, such as, Windows NT, Windows 2000 (Windows ME), Windows XP, Windows Vista, Windows Phone, or Windows 7 operating systems, available from the Microsoft Corporation, Android operating system available from Google, Blackberry operating system available from Blackberry Limited, a MAC OS System X operating system or an iOS operating system available from Apple, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 410 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, Ruby, Objective-C, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Expense Report Processes

Figure 5:
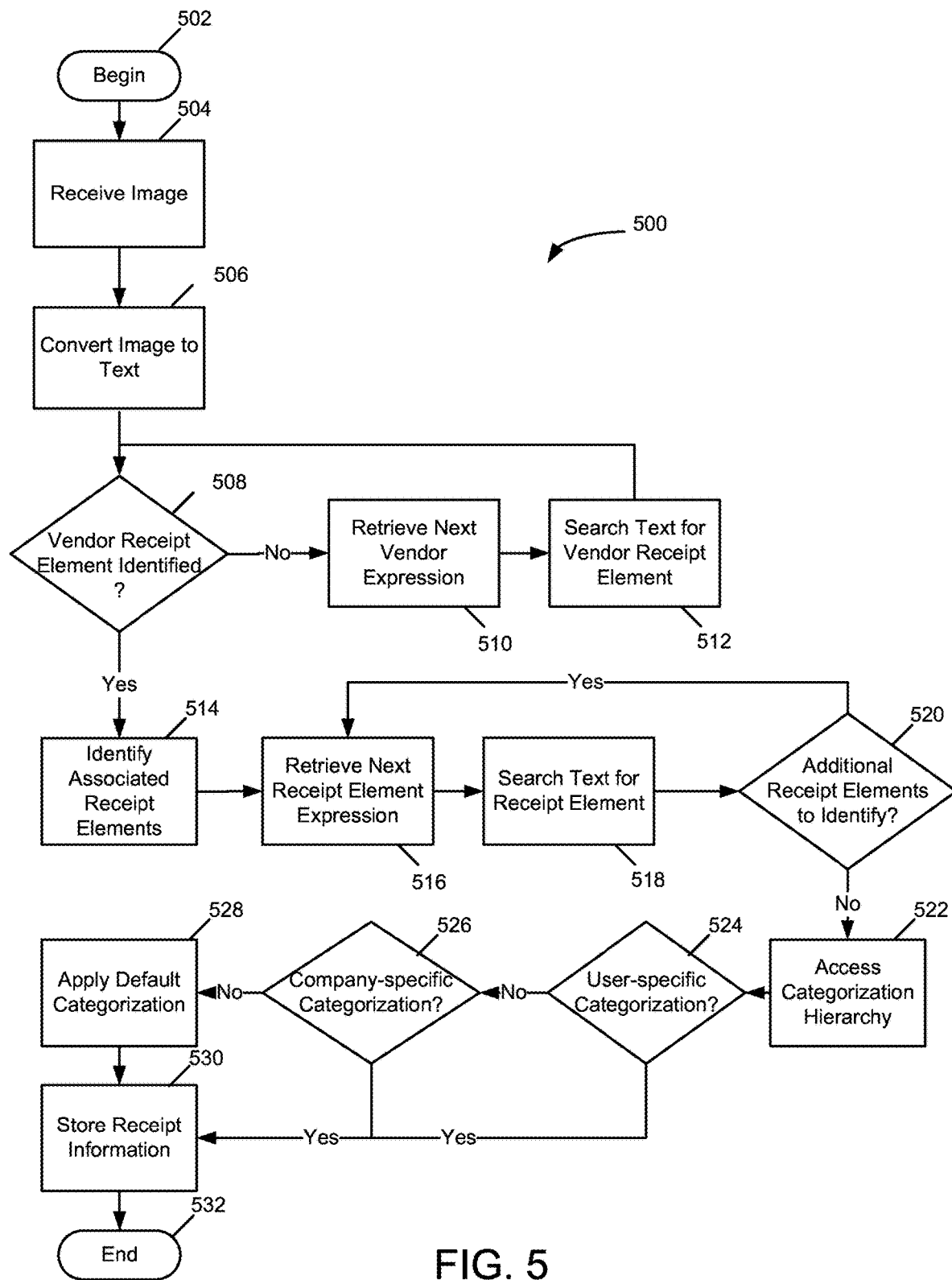
FIG. 5 is a flow diagram of a receipt parsing process.
Figure 6:
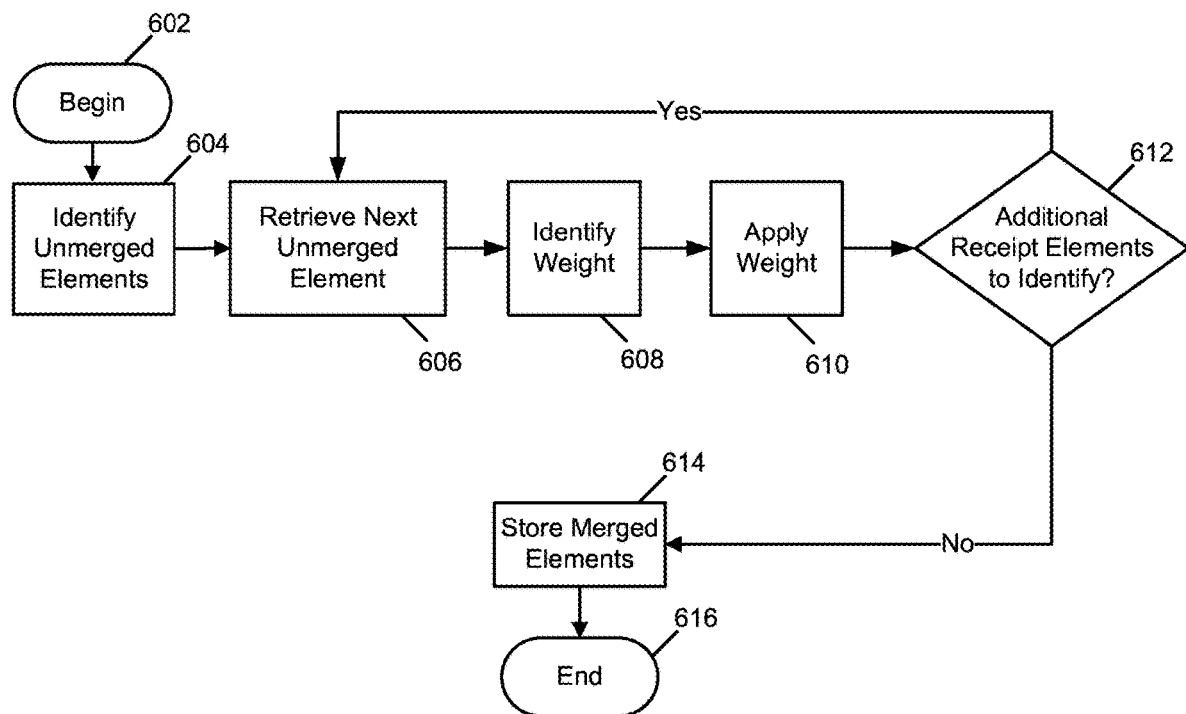
FIG. 6 is a flow diagram of a merging process.
Figure 7:
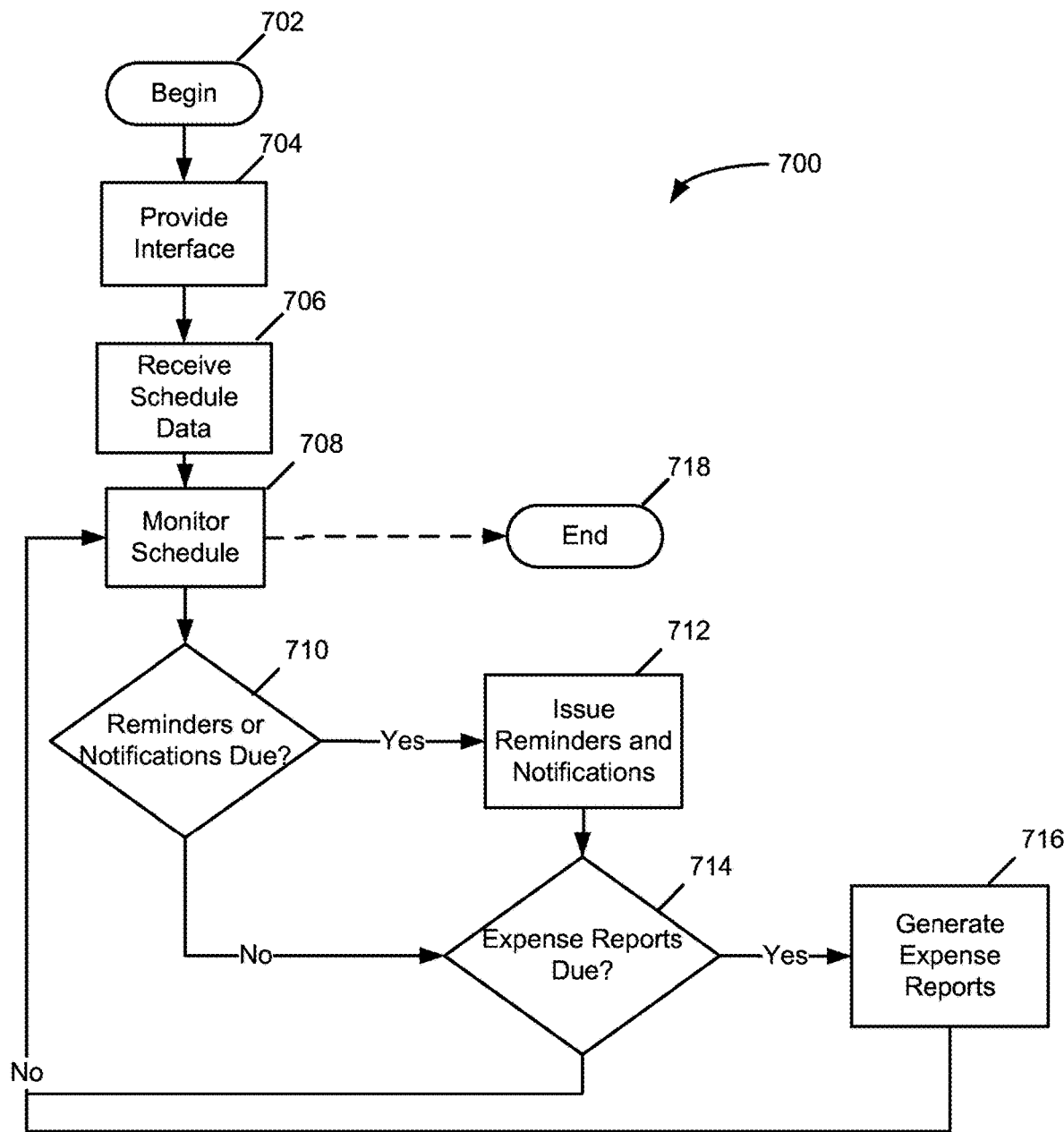
FIG. 7 is a flow diagram of an expense report generation process.

FIGS. 5-7 illustrate example expense report processes in accordance with various embodiments. These expense report processes may be executed by a wide variety of computer systems. For instance, according to some embodiments, these expense report processes are executed by an expense report system, such as the expense report system 100 described above with reference to FIG. 1.

FIG. 5 illustrates an example receipt parsing process 500 according to one embodiment. In this embodiment, the receipt parsing process 500 is executed by a receipt parsing component, such as the receipt parsing component 114 described above with reference to FIG. 1. As illustrated in FIG. 5, the receipt parsing process 500 includes acts of receiving an image of a receipt, converting the image to text, identifying a value of a vendor receipt element, identifying values of other receipt elements, classifying the transaction described by the receipt, and storing receipt information. The receipt parsing process 500 begins at 502.

In act 504, a receipt image is received. In at least one embodiment, when executing the act 504, the receipt parsing component receives the receipt image from an external system, such as the computer system 102 illustrated in FIG. 1. The receipt parsing component may receive the receipt image via data transfer mechanisms known in the art, such as via FTP, HTTP, etc. The received receipt image may depict a receipt of a transaction conducted on behalf of a business entity (e.g., a customer company associated with a user). The receipt image may include receipt elements needed to process an expense report referring to the transaction described by the receipt. Table 1 lists examples of receipt elements that may be included within the receipt image.

TABLE 1

| Receipt Element | Description |
| --- | --- |
| Date | Date/Time |
| Amount | Floating Point |
| Currency Type | Integer |
| Vendor | String |

TABLE 1-continued

| Receipt Element | Description |
| --- | --- |
| Location | String |
| Vendor Location ID | String |
| Reimbursable | Boolean |
| Description | String |
| Lodging Check-in Date | Date/Time |
| Lodging Check-out Date | Date/Time |
| Rental Pick-up Date | Date/Time |
| Rental Drop-off Date | Date/Time |
| Travel From Location | String (airport code) |
| Travel To Location | String (airport code) |
| Card ID | Integer |

Table 1

FIG. 8 illustrates one example of a receipt image 800. As shown in FIG. 8, the receipt image 800 includes several receipt elements. These receipt elements include a vendor 802, a vendor location 804, a date 806, a credit card ID 808, and an amount 810.

Returning to FIG. 5, in act 506, the receipt image is converted to text using conventional OCR processing. In at least one embodiment, when executing the act 506, the receipt parsing component converts the receipt image by executing an OCR processing component.

Next, in acts 508-512, the value of the vendor receipt element is identified. In at least one embodiment, when executing the acts 508-512, the receipt parsing component searches the converted text of the receipt image for the presence of one or more regular expressions associated with vendors and stored within an expense report data store (e.g., the expense report data store 128 described above with reference to FIG. 1). According to these embodiments, the receipt parsing component identifies the value of the vendor receipt element of a receipt by evaluating one or more regular expressions with reference to the converted text of the receipt to determine whether the regular expression is present within the converted text. These regular expressions may include literal characters and metacharacters. A regular expression is present in the converted text where the permutation of literal characters and metacharacters specified in the regular expression is disposed somewhere within the converted text. Literal characters must be expressly present in the converted text. Metacharacters must also be present in the converted text but are able to assume any set of characters or any set of specified characters, depending on the coding of the regular expression.

More particularly, according to one embodiment illustrated by FIG. 5, the receipt parsing component determines whether the vendor receipt element has been identified (e.g., has a non-null value) in act 508. If so, the receipt parsing component proceeds to act 514. Otherwise, the receipt parsing component retrieves, from the expense report data store, the next regular expression used to search for vendor receipt elements in act 510. Next, in act 512, the receipt parsing component uses the retrieved regular expression to search for the vendor receipt element in the converted text and returns to the act 508.

For example with reference to FIG. 8, to identify the value of the vendor receipt element included in the receipt image 800, the receipt parsing component may evaluate regular expressions including "((STA?BUCKS))" and "((AM?NO) (?=[A,U]))." Where the converted text of the receipt image 800 includes a string formed by concatenating "STA", any character, and "BUCKS," the receipt parsing component identifies the value of the vendor receipt element as STARBUCKS. However, in this example the converted text of the receipt image 800 includes no such string. Therefore, the receipt parsing component does not identify the value of the vendor receipt element as STARBUCKS. Continuing with this example, where the converted text of the receipt image 800 includes a string formed by concatenating "AM", either an "A" or a "U", and "NO," the receipt parsing component identifies the value of the vendor receipt element as AMANO. In this example, the converted text of the receipt image 800 includes such as string. Therefore, the receipt parsing component identifies the value of the vendor receipt element as AMANO. The use of regular expression based searches ameliorates the sporadically unpredictable conversion results of conventional OCR technology as applied to receipt images.

In acts 514-520, other receipt and expense elements associated with the identified vendor receipt element are identified. In at least one embodiment, when executing the acts 510-520, the receipt parsing component first identifies a set of receipt elements associated with receipts generated by the vendor indicated by the identified value of the vendor receipt element. For instance, the receipt parsing component may access a cross-reference in the expense report data store that associates values of vendor receipt elements with other receipt elements normally present in receipts generated by the vendor indicated by the identified value of the vendor receipt element. This cross-reference may also include, for each receipt element, vendor-specific receipt format information and a set of regular expressions used to identify values of the receipt elements within converted text. This receipt format information may specify a location of a value of a receipt element within converted text relative to the set of regular expressions. Table 2 illustrates one example of the cross-reference described above.

TABLE 2

| Vendor | Receipt Element | Regular Expression | Format Information |
| --- | --- | --- | --- |
| AMANO | Date | "Exit Time" | Next String |
| AMANO | Amount | "Total" | Next String |
| AMANO | Location | ((AM?NO)(?=[A,U])) | Next String(4) |
| AMANO | Card ID | "Account #" | Next String |

Table 2

Continuing with this embodiment, the receipt parsing component identifies values for each member of the set of the receipt elements based on the set of regular expressions and the receipt format information associated with the member.

More particularly, according to one embodiment illustrated by FIG. 5, the receipt parsing component identifies, within the act 514, a set of receipt elements associated with the vendor receipt element identified in acts 508-512. In act 516, the receipt parsing component retrieves the regular expression used to search for the next member of the set of receipt elements. In act 518, the receipt parsing component uses the retrieved regular expression to search for the next member of the set of receipt elements in the converted text. In act 520, the receipt parsing component determines whether any unprocessed members of the set of receipt element remain. If so, the receipt parsing component returns to the act 516. Otherwise, the receipt parsing component proceeds to the act 522.

According to one example illustrated with reference to FIG. 8, the receipt parsing component first determines that the following set of receipt elements is associated with the AMANO vendor {location, date, card ID, amount}. Next the receipt parsing component identifies a set of regular expressions and receipt format information for each member of the set of receipt elements.

Next, the receipt parsing component identifies the value of the vendor location receipt element based on the "((AM?NO)(?=[A,U]))" regular expression and receipt format information specifying that the value of the vendor location receipt element follows the "((AM?NO)(?=[A,U]))" regular expression. Next, the receipt parsing component identifies the value of the date receipt element based on the "Exit Time" regular expression and receipt format information specifying that the value of the date receipt element follows the "Exit Time" regular expression. Next, the receipt parsing component identifies the value of the card last ID element based on the "Account #" regular expression and receipt format information specifying that the value of the card ID element follows the "Account #" regular expression. Next, the receipt parsing component identifies the value of the Amount receipt element based on the "Total" regular expression and receipt format information specifying that the value of the Amount receipt element follows the "Total" regular expression. Although in this example, the receipt format instructions specify that values follow regular expression, other relative locations (e.g., before, between, 3 strings before, 3 strings after, etc.) may be specified without departing from the scope of the embodiments disclosed herein.

In some embodiments, the evaluation of a regular expression includes evaluation of non-textual elements. For example, in at least one embodiment, when executing the acts 508 through 520, the receipt parsing component may compare logos, bar codes (including matrix bar codes), or other visual objects presented in a receipt image to determine any of the receipt elements discussed here. Thus evaluation of regular expressions, as disclosed herein, is not keyed on any specific type of data.

In some embodiments, when executing acts 514-520, the receipt parsing component is configured to evaluate a plurality of nested regular expressions to identify and process values of some receipt elements. For example, some receipt images include dates in a format illustrated by the following: "Aug.12'13". In at least one embodiment, the receipt parsing component identifies such dates using the following regular expression:

"(Jan|Feb|Mar|Apr|May|Jun|Jul|Aug|Sep|Oct|Nov|Dec)(\sl).\d \d(\sl')\d\d"

Next, the receipt parsing component stores a normalized value in the Date receipt element for this receipt. In subsequent processing, the receipt parsing component uses the following regular expression to detect normalized date values:

"(\d{1,2}\/\d{1,2}V\d\d\d\d)|(20\d\d(-|/)(0|1)\d(-|/)(0|1|2|3)\d)"

In this way, some embodiments are able to change dozens of various date formats into one normalized date format that is easily identifiable and usable in subsequent processing.

In other embodiments, when executing the act 514-520, the receipt parsing component is configured to communicate with external computer systems (e.g., the partner computer systems 108 described above with reference to FIG. 1) where necessary to determine values of some expense elements. For example, when executing according to this configuration in one embodiment, the receipt parsing component identifies a telephone number as easily and accurately recognizable from the receipt image and, where the telephone number is recognized, identifies specifics about the vendor via a reverse telephone number lookup service. In other words, in this embodiment, the receipt parsing component retrieves a value for a Location expense element where the Location receipt element is not included in the receipt image. In this embodiment, the receipt parsing component transmits a request for location information to a partner system via a partner company interface (e.g., one of the partner company interfaces described above with reference to FIG. 1). For example, the partner company may provide a reverse telephone number lookup service. The request may include information identifying the location (e.g., a telephone number included in the receipt image). In response to receiving a response to the request including location information from partner computer system, the receipt parsing component stores the location information as the value of the Location expense element for the transaction.

In acts 522-528, the transaction described by the receipt is classified. In some embodiments, each distinct transaction is identified using a combination of the Date, Amount, and Vendor fields. In at least one embodiment, when executing the acts 522-528, the receipt parsing component determines, based on the expense elements identified in the converted text and the user, how the transaction described by the receipt should be classified within the account hierarchy of a customer company associated with the user. More particularly, in some embodiments, the receipt parsing component accesses, within the act 522, a categorization hierarchy stored in the expense report data store to classify the transaction. The categorization hierarchy may include historically based reference values sourced from different sets of users associated various customer companies and may reflect a configurable order of preference for types of categorization references used to automatically categorize transactions. For example, in at least one embodiment, this order of preference from most preferred to least preferred includes user-specific categorization preferences, company-specific categorization preferences, and system default (cross-company specific) categorization preferences. In this embodiment, the user-specific categorization preferences have reference values learned from historical categorization selections made by the user who conducted the transaction. The company-specific categorization preferences have reference values learned from historical categorization selections made by a group of users who are employees of the same customer company as the user to who conducted the transaction. The system default categorization preferences have reference values learned from historical categorization selections made by all users of the system or a subset thereof.

Further, in this embodiment, the receipt parsing component first attempts, within the act 524, to find a user-specific categorization preference within the categorization hierarchy for the transaction within the expense report data store using the expense elements identified in acts 508 through 520 and the identity of the user. If the receipt parsing component finds a user-specific categorization preference, the receipt parsing component categorizes the transaction according to the user preference and proceeds to act 530. Otherwise, the receipt parsing component attempts, within act 526, to find a company-specific categorization preference using the expense elements identified in acts 508 through 520 and the identity of the company associated with the user. If the receipt parsing component finds a company-specific categorization preference, the receipt parsing component categorizes the transaction according to the company preference and proceeds to the act 530. Otherwise, the receipt parsing component categorizes, within act 528, the transaction according to a system default categorization preference.

For example, in one embodiment, the receipt parsing component determines values for a Category ID expense element and a Justification expense element in the act 522-528. The Category ID expense element indicates a transaction category, such as lodging check-in/check-out, rental pick-up/drop-off, etc. The Justification expense element indicates a reason for the transaction. In this embodiment, the receipt parsing component matches key values of expense elements for transactions being processed to values of key expense elements for historical transactions previously verified by a user. Where the key expense elements match, the receipt parsing component stores the values of the Category ID expense elements and the Justification expense elements of the historical transactions within the Category ID expense elements and the Justification expense elements in the transactions being processed. In this embodiment, the key expense elements may include expense elements such as Vendor ID, User ID, Date, and other expense elements in previously verified transactions. In this way, the receipt parsing component is able to inspect historical behavior of the user and apply a Category ID and Justification where the user has repeatedly verified the same Category ID and Justification for what appears to be a similar transaction in the past.

In act 530, the receipt information is stored. In at least one embodiment, when executing the act 530, the receipt parsing component stores the receipt information in the expense report data store.

The receipt parsing process 500 ends at 532. Processes in accord with the receipt parsing process 500 enable expense report systems to extract receipt information from receipt images more effectively than conventional OCR processing. Moreover, the stored receipt information can be subsequently used to generate expense reports, thereby saving data entry time and cost.

FIG. 6 illustrates an example merging process 600 according to one embodiment. In this embodiment, the merging process 600 is executed by a merging component, such as the merging component 126 described above with reference to FIG. 1. As illustrated in FIG. 6, the merging process 600 includes identifying information sources, applying weights, and storing weighted information. The data merging process 600 begins at 602.

In act 604, unmerged elements of expense report information are identified. In at least one embodiment, when executing the act 604, the merging component accesses the expense report data store to identify elements of expense report information that have not been processed by the merging component. Table 3 lists elements of expense report data that may be identified in the act 604.

TABLE 3

| Expense Element | Description |
| --- | --- |
| User ID | Integer |
| User-Department ID | Integer |
| Prepaid Expense | Boolean |
| Category ID | Integer |
| Expense Report ID | Integer |
| Receipt ID | Integer |
| Card ID | Integer |

TABLE 3-continued

| Expense Element | Description |
| --- | --- |
| Date | Date/Time |
| Amount | Floating Point |
| Currency Type | Integer |
| VAT amount | Floating Point |
| PST amount | Floating Point |
| HST amount | Floating Point |
| Justification | String |
| Reimbursable | Boolean |
| Reimbursable amount | Floating Point |
| Validation Required | Boolean |
| Booked amount | Floating Point |
| Billable | Boolean |
| Imported | Boolean |
| Location | String |
| Vendor | String |
| Expense Input Method ID | Integer |
| Mobile Device ID | Integer |
| Vendor ID | Integer |
| Lodging Check-in Date | Date/Time |
| Lodging Check-out Date | Date/Time |
| Lodging Vendor | String |
| Meal Attendees | Integer |
| Meal Attendees Detail | String |
| Mileage | Floating Point |
| Mileage From Location | String |
| Mileage To Location | String |
| Mileage Rate | Integer |
| MapURL | String |
| Rental Vendor | String |
| Rental Pick-up Date | Date/Time |
| Rental Drop-off Date | Date/Time |
| Travel From Location | String (airport code) |
| Travel To Location | String (airport code) |
| Travel Vendor | String |
| Per Diem Start Date | Date/Time |
| Per Diem End Date | Date/Time |
| Hourly Rate Hours | Floating Point |
| User Defined Element ID | Integer |
| User Defined Element | String |
| Receipt File Name | String |
| Receipt Upload Date | Date/Time |
| Receipt Input Method ID | Integer |
| Receipt Tag | String |

Table 3

Each of these unmerged elements of expense report information may be a member of a set of expense report information that describes a transaction to be included in an expense report. In addition, each element of expense report information in the set may describe one or more characteristics of the transaction. In some embodiments, the merging component identifies unmerged elements of expense report information by identifying elements of expense report information not assigned with a weight value.

According to one example now described with reference to FIG. 8, the expense report system receives partner information via a partner interface component (e.g., the partner interface 124) that describes a parking transaction having a value of "Natalie's Parking Service" for its Vendor expense element, a value of 7523 for its Category ID expense element, a value of "8/17/2014" for its Date expense element, and a value of $8.00 for its Amount expense element. In response to receiving this partner information, the partner interface stores, within the expense report data store, a Vendor expense element for the parking transaction having a value of "Natalie's Parking Service" and a weight of null, a Category ID expense element for the parking transaction having a value of 7523 and a weight of null, a Date expense element for the parking transaction having a value of "8/17/2014" and a weight of null, and an Amount expense element for the parking transaction having a value of $8.00 and a weight of null. Prior to generating an expense report covering the parking transaction, the expense report system receives the receipt image 800 via the receipt parsing component. In response to receiving this receipt information, the receipt parsing component stores, within the expense report data store, a Vendor expense element for the parking transaction having a value of "Natalie's Parking Service" and a weight of null, a Category ID expense element for the parking transaction having a value of 8675309 and a weight of null, a Date expense element for the parking transaction having a value of "8/17/2014" and a weight of null, and an Amount expense element for the parking transaction having a value of $8.00 and a weight of null.

Prior to generating an expense report covering the parking transaction, the expense report system also receives input from a user via a receipt entry user interface component (e.g., one of the receipt entry user interfaces 118) that specifies a Vendor expense element for the parking transaction having a value of "Natalie's Parking Service," a Category ID expense element for the parking transaction having a value of 4322453, a Date expense element for the parking transaction having a value of "8/17/2014," and an Amount expense element for the parking transaction having a value of $8.00. In response to receiving this receipt information, the receipt entry user interface stores, within the expense report data store, a Vendor expense element for the parking transaction having a value of "Natalie's Parking Service" and a weight of null, a Category ID expense element for the parking transaction having a value of 4322453 and a weight of null, a Date expense element for the parking transaction having a value of "8/17/2014" and a weight of null, and an Amount expense element for the parking transaction having a value of $8.00 and a weight of null. In this example, the merging component, when executing the act 604, would identify each of the elements described above as being an unmerged element.

Next, in act 606-612, a weight value is assigned to each unmerged element of expense report information. In some embodiments, when executing the act 606-612, the merging component identifies a weight value for each unmerged element of expense report information by accessing a cross-reference in the expense report data store that associates a combination of data source and element type with weight values. Table 4 illustrates one example of the cross-reference described above.

TABLE 4

| Element Type | Data Source | Weight |
| --- | --- | --- |
| Amount | Partner | 50 |
| Amount | Receipt Parse | 75 |
| Amount | User Receipt Entry | 99 |

Table 4

In these embodiments, the merging component assigns a weight value to each unmerged element that is equal to the weight value associated with a combination of the data source and the element type of the unmerged element.

In some embodiments, the merging component references additional information when assigning weight values. For example, according to at least one embodiment, the merging component assigns different weight values to particular expense elements where other expense elements are present within the same data source. For example, with reference to Table 4, an Amount expense element sourced from a Partner data source may have a weight of 60 (rather than 50 as shown in Table 4) where the Partner data source also provides a Vendor ID expense element. Thus embodiments are not limited to the dimensions (i.e., Element Type and Data Source) listed in Table 4 when determining the appropriate weight value to assign to an expense element.

More particularly, according to one embodiment illustrated by FIG. 6, the merging component retrieves, within the act 606, the next unmerged element of expense report information from the unmerged elements of expense report information identified in the act 604. In act 608, the merging component identifies, within the cross-reference stored in the expense report data store, a weight value associated with the type and data source of the unmerged element of expense report information identified in act 606. In act 610, the merging component stores the identified weight value as the weight value of the unmerged element. In act 612, the merging component determines whether additional unmerged elements of expense report information remain. If so, the merging component returns to the act 606. Otherwise, the merging component proceeds to the act 614.

Continuing the example described above with reference to FIG. 8, the merging component executing the acts 606-612 would find entries in the cross-reference that associate a first weight with the Category ID expense element received via the partner interface component, a second weight with the Category ID receipt element received via the receipt parsing component, and a third weight with the Category ID receipt element received via the receipt entry user interface component. In this example, the first weight is less than the second weight and the second weight is less than the third weight.

Next, in act 614, unmerged elements of expense report information describing a transaction are merged into a unified set of expense report information describing the transaction. In some embodiments, when executing the act 614, the merging component generates a set of expense report information that includes elements having the highest weights and stores the set of expense report information for subsequent expense report generation processing. This subsequent processing may include validation of the set of expense report information by the user.

Continuing the example described above with reference to FIG. 8, the merging component executing the act 614 combines all of the expense and receipt elements stored in the expense report system interface for the parking transaction into a unified set of expense report information. To resolve the conflict between the duplicate Category ID expense and receipt elements described above, the merging component compares the first, second, and third weights to determine the largest weight and stores, within the unified set of expense report information, the Category ID element having the greatest weight (i.e., the Category ID receipt element having the third weight).

The merging process 600 ends at 616. Processes in accord with the merging process 600 enable expense report systems to incorporate expense report information from a variety of data sources to automatically generate expense reports using the most accurate and reliable data available. In this way, processes in accord with the merging process 600 increase the efficiency of the expense report system by increasing the accuracy of automatically generated expense reports, thereby decreasing the amount of rework required after initial generation of the expenses reports.

FIG. 7 illustrates an example expense report generation process 700 according to one embodiment. In this embodiment, the expense report generation process 700 is executed by a reporting component, such as the reporting component 130 described above with reference to FIG. 1. As illustrated in FIG. 7, the expense report generation process 700 includes receiving schedule data, issuing reminders and notifications, and generating expense reports. The expense report generation process 700 begins at 702.

In act 704, a user interface is provided. In some embodiments, when executing the act 704, the reporting component provides a user interface that communicates schedule information with a user. More specifically, in at least one embodiment, the reporting component provides a user interface that communicates both company-wide and employee-specific schedule information. In this embodiment, the user interface receives, within act 706, input from administrative users that establishes the company-wide schedule. Further, in this embodiment, the user interface receives, within the act 706, input from employee users that establishes employee-specific schedules. In some embodiments, the user interface receives, within the act 706, input that disables the employee-specific schedule functionality for some or all employee users, thereby forcing employee users to adhere to the company-wide schedule.

FIGS. 9-12 illustrate examples of user interface screens provided by the reporting component and through which the reporting component receives schedule information when executing the act 704. More specifically, FIG. 9 illustrates of a user interface screen 900 that is configured to communicate company-wide schedule information with a user (e.g., the user 132 described above with reference to FIG. 1) using radio buttons with embedded text boxes and list boxes. The user interface screen 900 may both display and receive schedule information. In response to receiving schedule information in the form of input from the user indicating a selection of one of the radio buttons, the user interface screen 900 activates the selected radio button and configures the company-wide schedule to conform to the schedule information associated with the selected radio button.

As shown in FIG. 9, the user interface screen 900 provides several options for specifying an expense report generation date (referred to as a "Build Day" in FIG. 9). In some embodiments, the expense report generation date is a configurable parameter set by administrative users of the expense report system and stored in the expense report data store. In these embodiments, each schedule (company-wide or employee-specific) maintained within the expense report system may have a distinct expense report generation date accessible via the user interface screen 900.

FIG. 10 illustrates a user interface screen 1000 that is configured to communicate date adjustment information with the user using a text box. The user interface screen 1000 may both display and receive schedule information. In response to receiving schedule information in the form of input from the user indicating a number of days to adjust the date range of automatically generated expense reports, the user interface screen 1000 stores the number days to adjust the date range entered by the user in the expense report data store. As described further below, the reporting component uses the adjustment information to safely buffer expense report start and end dates so that recent transactions are settled before being included in an automatically generated expense report. According to various embodiments, each schedule maintained within the expense report system may have distinct date adjustment information that is accessible via the user interface screen 1000.

FIG. 11 illustrates a user interface screen 1100 that is configured to communicate types of employees who may setup employee-specific schedules using check boxes. The user interface screen 1100 may both display and receive schedule information. In response to receiving schedule information in the form of input from the user indicating selection of one or more check boxes, the user interface screen 1100 stores, within the expense report data store, the types of employees who may, or who may not, setup employee-specific schedules.

FIG. 12 illustrates a user interface screen 1200 that is configured to communicate reminders, notifications, and expense report generation options using check boxes and text boxes. The user interface screen 1200 may both display and receive schedule information. In response to receiving schedule information in the form of input from the user indicating which reminders, notifications, and expense report generation options to implement, the user interface screen 1200 stores information identifying the selected options and customized text in the expense report data store.

As shown in FIG. 12, the user interface screen 1200 provides several options for notifying and reminding employee users to enter or otherwise provide expense report information prior to an expense report generation date (referred to as a "Build Day" in FIG. 12). In some embodiments, the expense report generation date is a configurable parameter set by administrative users of the expense report system and stored in the expense report data store. In these embodiments, each schedule maintained within the expense report system may have a distinct expense report generation date. Also as illustrated in FIG. 12, the user interface screen 1200 provides several options for notifying and reminding employee users to review and submit generated expense reports after the expense report generation date.

In some embodiments, the reporting component is configured to provide a user interface screen 1200 for each schedule maintained within the expense report system. In these embodiments, the reminders, notifications, and expense report generation options selected in the user interface screen 1200 for each schedule apply to the users associated with the schedule. Thus the user interface screen 1200 may communicate reminders, notifications, and expense report generation options for a company-wide schedule applicable to most of the employee users of a company and may communicate reminders, notifications, and expense report generation options for an employee-specific schedule applicable to only a few employee users of the company.

In act 708, the schedule is monitored. In at least one embodiment, when executing the act 708, the reporting component periodically checks schedule information stored in the expense report data store against current date and time information. In act 710, the reporting component determines whether any reminders or notifications are due by comparing the current date and time information to the schedule information stored in the expense report data store. If one or more reminders or notifications are due, the reporting component proceeds to act 712. Otherwise, the reporting component proceeds to act 714.

In act 712, reminders and notifications are issued. In at least one embodiment, when executing the act 712, the reporting component issues reminders and notifications according to the currently selected options. As shown in FIG. 12, these selected options may specify that customized text be included in the reminder or notification.

In act 714, the reporting component determines whether any expense reports are due by comparing the current date and time information to the schedule information stored in the expense report data store. If one or more expense reports are due, the reporting component proceeds to act 716. Otherwise, the reporting component returns to the act 708.

In act 716, expense reports are generated. In at least one embodiment, when executing the act 716, the reporting component generates expense reports according to the company-wide or employee-specific schedule. In generating the expense reports, the report executive will include transactions that were not processed in a previous expense report and that have a Date expense element that is older than the current date minus the number of days specified in the date adjustment information.

The expense report generation process 700 ends at 718. Processes in accord with the expense report generation process 700 enable expense report systems to generate expense reports according to a consistent company-wide schedule while maintain flexibility with regard to the schedule for particular types of employees. In addition, processes in accord with the expense report generation process 700 enable expense report systems to automatically issue reminders and notifications to increase schedule compliance by users.

Processes 500, 600, and 700 each depict one particular sequence of acts in a particular embodiment. The acts included in these processes may be performed by, or using, one or more computer systems specially configured as discussed herein. Some acts are optional and, as such, may be omitted in accord with one or more embodiments. Additionally, the order of acts can be altered, or other acts can be added, without departing from the scope of the embodiments described herein. Furthermore, as described above, in at least one embodiment, the acts are performed on particular, specially configured machines, namely an expense report system configured according to the examples and embodiments disclosed herein.

Having thus described several aspects of at least one example, it is to be appreciated that various alterations, modifications, and improvements will readily occur to those skilled in the art. For instance, examples and embodiments disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system comprising:
   a receipt parsing component executable by at least one processor and configured to:
   access a plurality of regular expressions associated with a plurality of vendor elements;
   identify a string of characters in received text that matches a character pattern specified by at least one regular expression of the plurality of regular expressions, wherein the at least one regular expression includes metacharacters;
   capture a value of a vendor element from the received text, wherein the value of the vendor element comprises the string of characters that match the character pattern;
   access reference data specifying additional elements associated with the value of the vendor element and information to identify values of the additional elements;

capture the values of the additional elements in the text based on the reference data, wherein capturing the values of the additional elements includes:
  searching the text for regular expressions associated with the additional elements; and
  locating the values of the additional elements using receipt format information associated with the additional elements that specifies locations for the values relative to the regular expressions; and
store the value of the vendor element and the values of the additional elements in a data store.

2. The system of claim 1, wherein the receipt processing component is configured to receive an electronic record of transaction information for processing.

3. The system of claim 1, wherein the receipt processing component is configured to receive a visual record of transaction information.

4. The system of claim 1, wherein the wherein the receipt processing component is configured to receive an electronic file including a record of transaction information.

5. The system of claim 1, wherein the received text is generated from an optical character recognition (OCR) process.

6. The system of claim 1, wherein the receipt parsing component is further configured to identify a category for a transaction described by transaction information.

7. The system of claim 6, wherein the receipt parsing component is configured to identify the category using at least one of the value of the vendor element and the values of the additional elements.

8. The system of claim 2, wherein the receipt parsing component is configured to receive the electronic record from an external system.

9. A method of parsing receipt information using a computer system, the method comprising:
  accessing a plurality of regular expressions associated with a plurality of vendor elements;
  identifying a string of characters in received text that match a character pattern specified by at least one regular expression of the plurality of regular expressions, wherein the at least one regular expression includes metacharacters;
  capturing a value of a vendor element from the received text, wherein the value of the vendor element comprises the string of characters that match the character pattern;
  accessing reference data specifying additional elements associated with the value of the vendor element and information to identify values of the additional elements;
  capturing the values of the additional elements in the received text based on the reference data, wherein the act of capturing the values includes:
    searching the received text for regular expressions associated with the additional elements; and
    locating the values of the additional elements using receipt format information associated with the additional elements that specifies locations for the values relative to the regular expressions; and
  storing the value of the vendor element and the values of the additional elements in a data store.

10. The method of claim 1, further comprising an act of receiving an electronic record of transaction information for processing.

11. The method of claim 1, further comprising an act of receiving a visual record of transaction information.

12. The method of claim 1, further comprising an act of receiving an electronic file including a record of transaction information.

13. The method of claim 1, further comprising an act of generating the received text from an optical character recognition (OCR) process.

14. The method of claim 1, further comprising an act of identifying a category for a transaction described by transaction information.

15. The method of claim 6, further comprising an act of identifying the category using at least one of the value of the vendor element and the values of the additional elements.

16. The method of claim 2, further comprising an act of receiving the electronic record from an external system.

17. A non-transitory computer readable medium comprising instructions that when executed cause at least one processor to perform a method of parsing receipt information, the method comprising:
  accessing a plurality of regular expressions associated with a plurality of vendor elements;
  identifying a string of characters in received text that match a character pattern specified by at least one regular expression of the plurality of regular expressions, wherein the at least one regular expression includes metacharacters;
  capturing a value of a vendor element from the received text, wherein the value of the vendor element comprises the string of characters that match the character pattern;
  accessing reference data specifying additional elements associated with the value of the vendor element and information to identify values of the additional elements;
  capturing the values of the additional elements in the received text based on the reference data, wherein the act of capturing the values includes:
    searching the received text for regular expressions associated with the additional elements; and
    locating the values of the additional elements using receipt format information associated with the additional elements that specifies locations for the values relative to the regular expressions; and
  storing the value of the vendor element and the values of the additional elements in a data store.

18. The computer readable medium of claim 17, further comprising an act of receiving an electronic record of transaction information for processing.

19. The computer readable medium of claim 17, further comprising an act of receiving a visual record of transaction information.

20. The computer readable medium of claim 17, further comprising an act of receiving an electronic file including a record of transaction information.

* * * * *